United States Patent [19]
Braden et al.

[11] 3,818,576
[45] June 25, 1974

[54] METHOD FOR MANUFACTURING V BELTS

[75] Inventors: William D. Braden, Stow; Richard P. Marshall, Tallmadge, both of Ohio

[73] Assignee: The Goodyear Tire & Rubber Company, Akron, Ohio

[22] Filed: Sept. 28, 1972

[21] Appl. No.: 293,295

Related U.S. Application Data

[62] Division of Ser. No. 70,138, Sept. 8, 1970, Pat. No. 3,711,996.

[52] U.S. Cl. ............ 29/414, 29/417, 29/557, 29/558, 264/159, 264/163
[51] Int. Cl. ............................. B23p 17/00
[58] Field of Search ........ 29/412, 417, 413, 156.62, 29/414, 557, 558; 83/505, 506, 187; 264/159, 162, 163; 51/3, 5, 165 SP, 105 R, 166 T, 95 WH, 48, 49

[56] References Cited
UNITED STATES PATENTS

| | | |
|---|---|---|
| 826,104 | 7/1906 | Honiss ............................ 29/417 X |
| 1,049,255 | 12/1912 | Merritt ............................ 82/100 X |
| 2,321,421 | 6/1943 | Rickenmann ................ 51/165.92 X |
| 2,661,579 | 12/1953 | Lomazzo et al. ..................... 51/5 X |
| 2,907,101 | 10/1959 | Hamm ............................ 29/414 X |
| 3,477,895 | 11/1969 | Sauer ............................ 264/159 X |

*Primary Examiner*—Charles W. Lanham
*Assistant Examiner*—V. A. DiPalma
*Attorney, Agent, or Firm*—F. W. Brunner; M. L. Gill

[57] ABSTRACT

A cylindrical cured cord reinforced rubber sleeve is rigidly supported on rotatable, expandable mandrel, the mandrel is rotated about is longitudinal axis, a plurality of rotating grinding wheels are passed by the peripheral surface of the mandrel in a direction perpendicular to the longitudinal axis of the mandrel and engage the sleeve to cut peripheral grooves in the sleeve, and a plurality of rotating cutting blades pass the peripheral surface of the mandrel in a similar manner to sever the sleeve into a plurality of V belts.

2 Claims, 11 Drawing Figures

METHOD FOR MANUFACTURING V BELTS

This is a Division of applicaton Ser. No. 70,138 filed Sept. 8, 1970 now U.S. Pat. No. 3,711,996.

The foregoing abstract is not to be taken as limiting the invention of this application, and in order to understand the full nature and extent of the technical discloure of this application, reference must be made to the accompanying drawings and the following detailed description.

This invention relates to the manufacture of V belts, and more particularly to a method and apparatus for forming a plurality of V belts from a cured cylindrical sleeve.

V belts can be manufactured in several ways. For example, each belt can be formed individually of cords, fabric and uncured rubber, confined in a shaping and curing mold and cured under heat and pressure. Another method would include the fabrication of a cylindrical sleeve of fabric and uncured rubber. The uncured sleeve is then cut into a plurality of endless belts. These endless belts are then placed in a shaping and curing mold and cured under heat and pressure. Still a third method, the method with which this invention is concerned, comprises the steps of forming a cylindrical sleeve of cord and uncured rubber, curing the sleeve in a cylindrical shape and after the sleeve is cured cutting the sleeve into a plurality of endless V belts. The present invention is directed to a method and apparatus for forming V belts from a cured cylindrical sleeve.

It is an object of this invention to provide a method and apparatus for cutting, with speed and accuracy, a cured cylindrical sleeve of rubber or similar elastomeric material into a plurality of V belts.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 11 is a view of a portion of the apparatus of FIG. 1, taken substantially along line 11—11 of FIG. 1.

Figure 5:
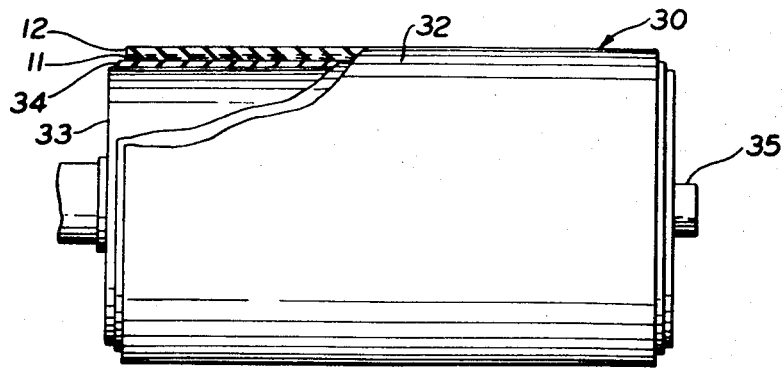
FIG. 5 is a side view of a collapsible mandrel and cured cylindrical sleeve with portions broken away.

With reference to the drawings, and in particular FIG. 5, there is illustrated a cured cylindrical sleeve 32 mounted on an expandable mandrel 30. The sleeve 32 may be of any construction desired; however, the radially inner portion 11 will generally be a cord reinforced tension section and the radially outer portion 12 a compression section. The mandrel 30 is in an expanded state and holds the sleeve 32 firminly in a cylindrical configuration.

Figure 6:
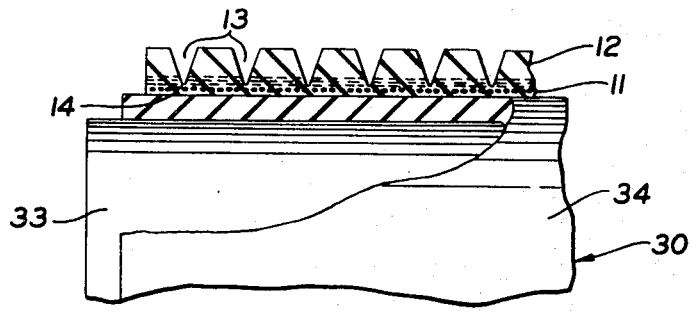
FIG. 6 is an enlarged view of a portion of the collapsible mandrel in FIG. 5 with the sleeve partially ground into V belts.
Figure 7:
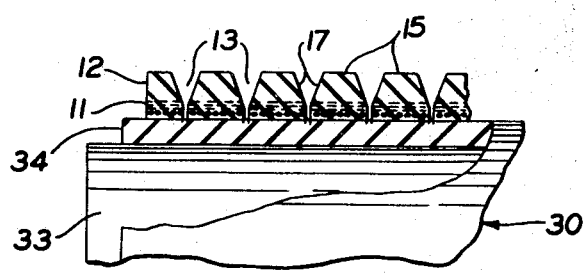
FIG. 7 is a view similar to FIG. 6 with the sleeve completely cut into V belts.
Figure 8:
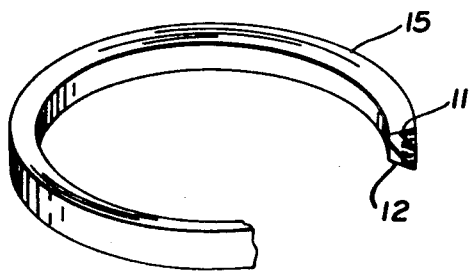
FIG. 8 is a perspective view of a V belt formed on the apparatus of FIG. 1.

As illustrated in FIG. 6, and in accordance with this invention, a plurality of circumferentially extending V shaped grooves 13 are ground in the peripheral surface of the sleeve 32 while the sleeve 32 is on the expanded mandrel 30. The V shaped notches or grooves 13 do not extend completely through the sleeve 32 but rather extend to a point 14 slightly short of the radially inner surface of the sleeve 32 and the radially outer surface of a cylindrical rubber pad 34 on the mandrel 30. The sleeve 32 is then severed into a plurality of V belts 15 by cutting through the last thickness of the cylindrical sleeve at the base 14 of the V grooves 13 to the rubber pad 34, as illustrated in FIG. 7. At this point the V belts 15 are completely shaped but are turned inside out. The belts are then removed from the mandrel 30 and a simple operation of "flipping" the V belts 15 inside out results in the finished product illustrated in FIG. 8.

Figure 2:
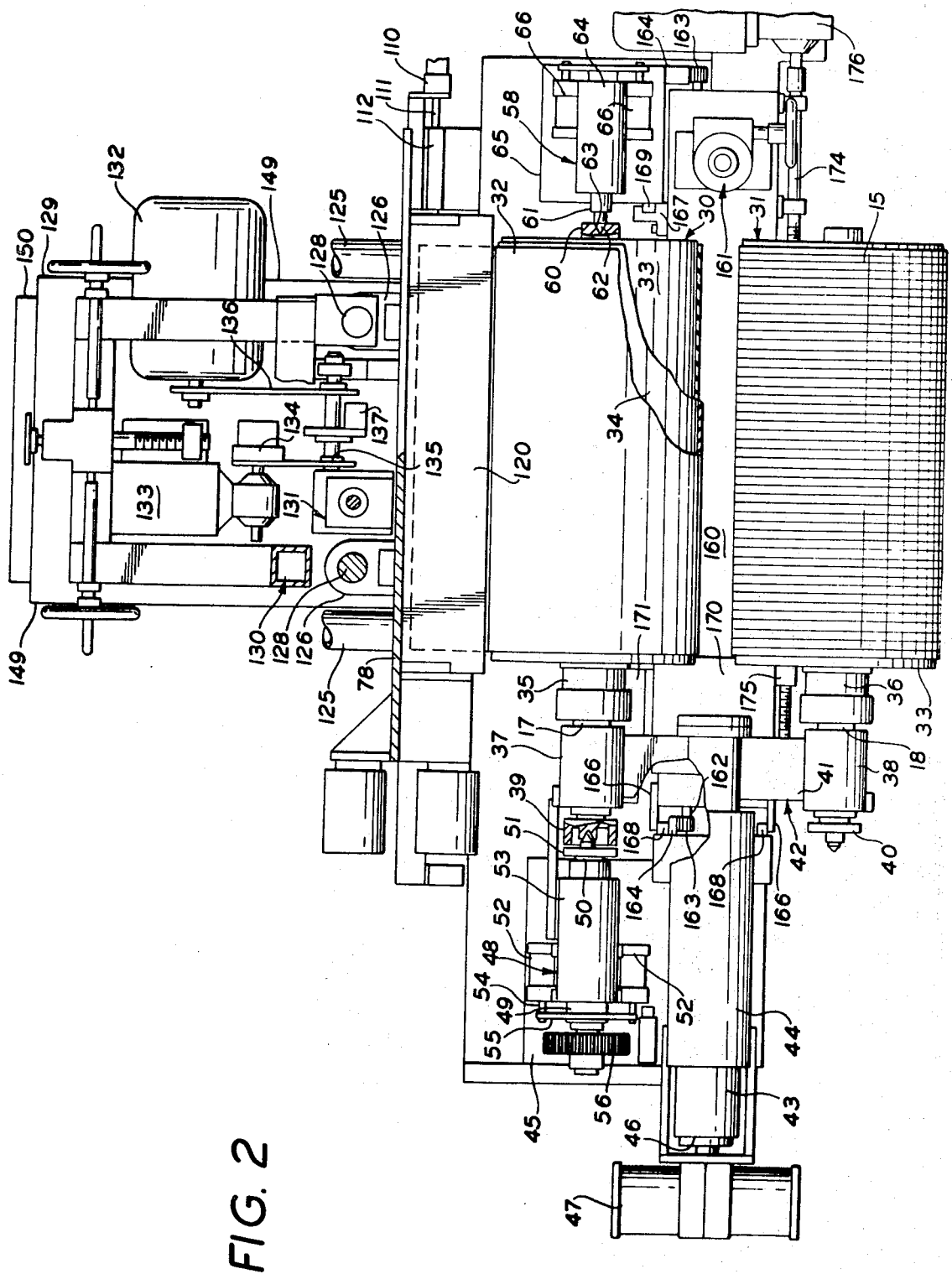
FIG. 2 is a top view of the apparatus of FIG. 1, taken substantially along the line 2—2 with portions broken away.

With reference to FIG. 2, a pair of expandable cylindrical mandrels 30, 31 are mounted with their rotational axes parallel and lying in a horizontal plane. The mandrels 30, 31 are rotatably supported at one end by a turret 42 which can be rotated about the axis of the leg 43 thereof to reverse the positions of the mandrels 30, 31.

As best seen in FIGS. 1 through 4, three parallel arbors 70, 71, 72 are arranged with their axes lying in a vertical plane and parallel to the rotational axes of the mandrels 30, 31. The arbors 70, 71, 72 are all mounted for rotation about their respective axes on a rack 78 which is slidably mounted on a pair of vertical rods 128 for movement therealong. The mandrel 30 is closest to the plane of motion of the axes of the arbors 70, 71, 72 when the rack 78 slides on the rods 128 and is the mandrel in 37 cutting position." The mandrel 31 is in the position farthest from said plane of motion of the axes of the arbors 70, 71, 72 and is the mandrel in the "loading position." Means are provided to rotate the mandrel 30 in the cutting position and means are provided to rotate the arbors 70, 71, 72 as they are moved downwardly on the parallel rods 128. The sequential motion of the arbors 70, 71, 72 past the mandrel 30 in the cutting position is illustrated in phantom in FIGS. 3 and 4. The rods 128 are mounted on a rectangular, flat, horizontal adjusting plate 129 which is supported on a horizontal base plate 10. The adjusting plate 129 is mounted for movement in two directions perpendicular to the plane of motion of the axes of the arbors 70, 71, 72. The mandrel 30 in the cutting position is positioned such that as the rotating arbors 70, 71, 72 are moved downwardly on the parallel rods, the grinders and cutters on the arbors 70, 71, 72 will successively traverse the peripheral surface 16 of the rotating mandrel 30 in a direction perpendicular to the rotational axis of the mandrel 30 and cut circumferential grooves 13 in the sleeve 32 mounted thereon to form a plurality of V belts 15, as described above and illustrated in FIGS. 5 to 7.

Figure 1:
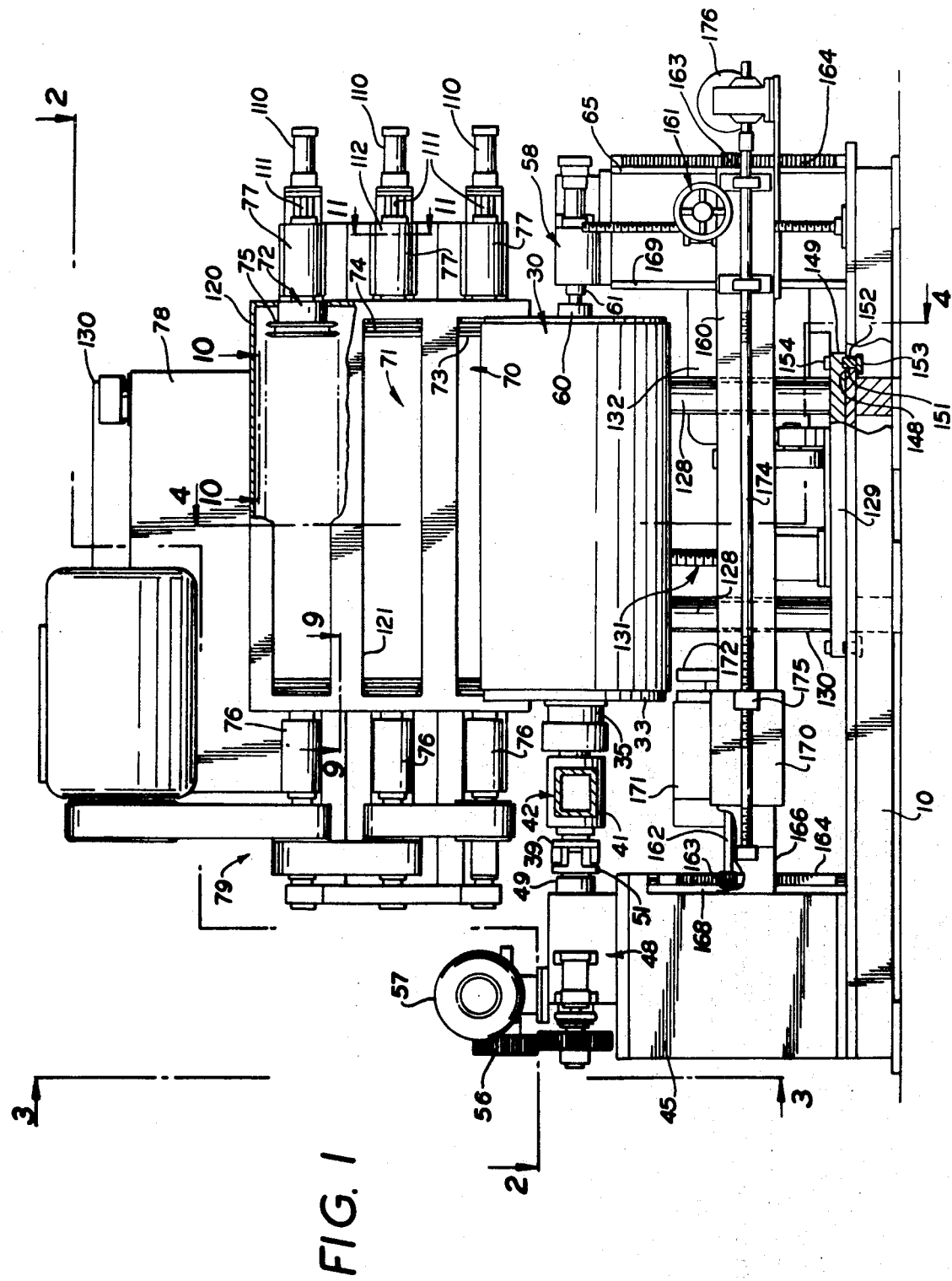
FIG. 1 is a front elevational view of the apparatus of this invention with portions broken away.

More particularly and with reference to FIGS. 1 and 2, the expandable mandrels 30, 31 can be of any construction well known in the art but must provide a firm cylindrical surface when expanded in order to support the sleeve 32 in a cylindrical configuration for cutting. In the particular embodiment illustrated the expandable mandrel 30 or 31 comprises an expandable metal base or drum 33 generally illustrated at 33 with its outer cylindrical surface covered by a cylindrical rubber pad 34. The rubber pad 34 serves the purpose of providing a surface against which the grinders and cutters may cut so as to not dull the grinders and cutters. A cured cylindrical sleeve 32 to be cut into V belts is illustrated on the mandrel 30 in the cutting position. A sleeve that has been cut into V belts is illustrated on the mandrel 31 in the loading position.

As best seen in FIGS. 1 through 4, the mandrels 30 and 31 are disposed with their rotational axes lying in a horizontal plane and parallel to the plane of motion of the arbors 70, 71, 72 when the rack 78 moves along the vertical rods 128. Each mandrel 30, 31 is supported by a shaft 35, 36, respectively, extending coaxially therethrough. Ends 17, 18 of the shafts 35, 36, respectively, extend out of adjacent ends of the mandrels 30, 31 and are supported for rotation about the axis of the respective shafts 35, 36 by a pair of anti-friction bearings 37, 38. Each shaft 35, 36 extends beyond the side of its respective bearing 37, 38 and has one-half of a jaw-type clutch 39, 40 mounted thereon.

The bearings 37 and 38 are mounted on opposite ends of an integral straight cross-bar 41 of a generally T-shped turret 42. The turret 42 is arranged with its leg or rotational shaft 43 and is cross-bar 41 in a horizontal plane. The axis of the shaft 43 is parallel to the axes of the mandrels 30, 31 and the bearings 37 and 38 are located at equal radial distances from the rotational axis of the shaft 43 of the turret 42. Thus, it can be seen that by rotating the turret 42 about the axis of its shaft 43 the positions of the bearings 37 and 38 can be reversed. The result is that the mandrel 30 in the cutting position can be switched with the mandrel 31 in the loading position by rotating turret 42 180°. The mandrels 30, 31 can then be returned to their original positions by reversing the turret 42 180°.

A generally horizontal bearing 44 mounted on a first upstanding frame 45 supports the turret 42 for rotation about its horizontal axis or rotational shaft 43. The end 46 of the shaft 43 opposite the integral cross-bar 41 extends beyond the bearing 44 and is operable connected to a reversing valve 47. The reversing valve 47 is adapted to rotate the turret 180 degrees in one stroke and return the turret to its original position on the return stroke. As will be appreciated by those skilled in the art, the turret 42 need not be turned by a reversing valve but could be turned by any means desired.

Figure 3:
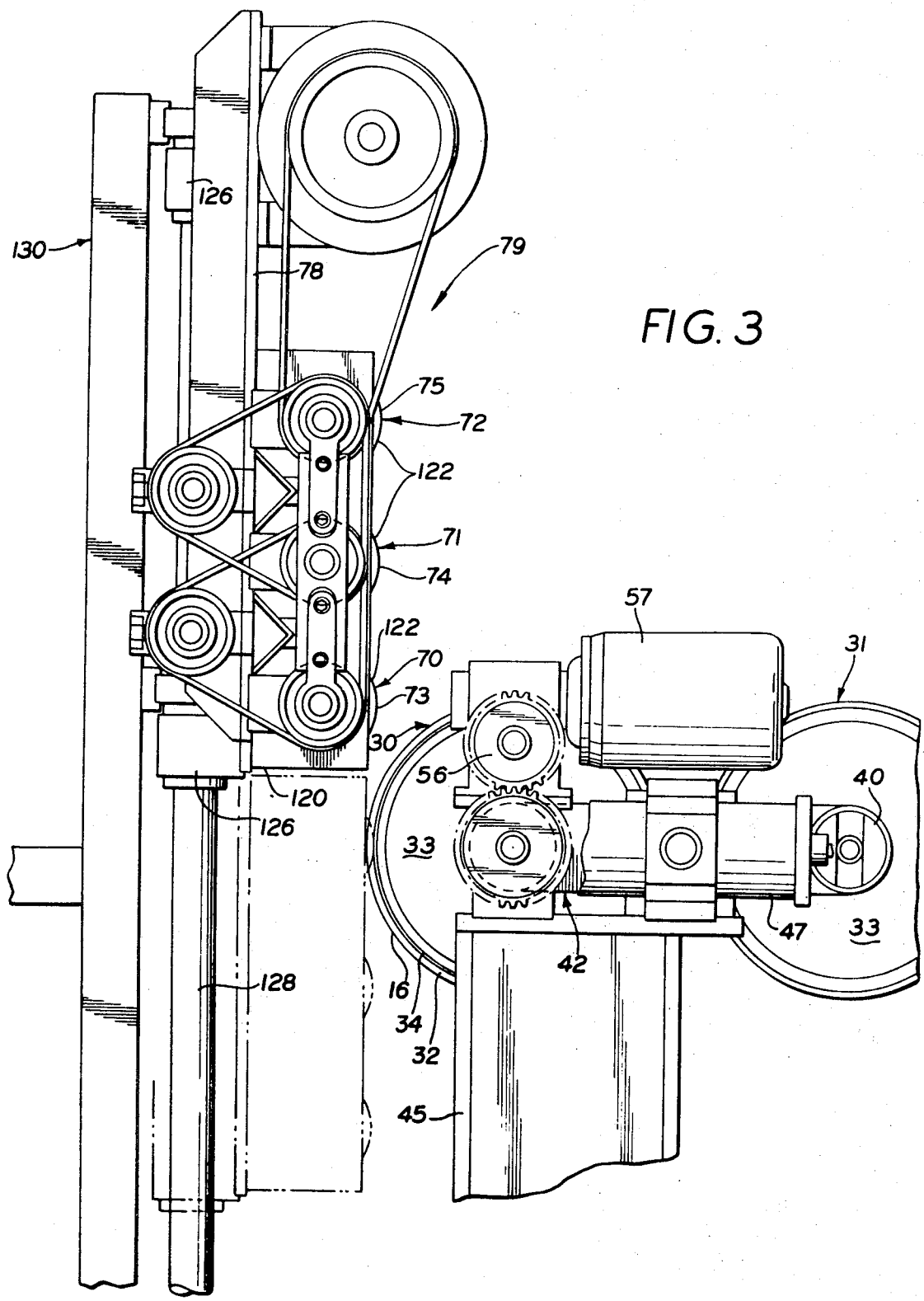
FIG. 3 is a partial side view of the apparatus of FIG. 1, taken substantially along the line 3—3 of FIG. 1 with portions broken away.

As best seen in FIGS. 1 through 3, a means 48 for rotating the mandrel 30 in the cutting position is mounted on top of the first up-standing frame 45 adjacent the turret bearing 44. This drive means, generally illustrated at 48, comprises a horizontal shaft 49 which is in axial alignment with the shaft 35 of the mandrel 30 in the cutting position and is supported by a bearing 53 mounted on the first up-standing frame 45. The end 50 of the shaft 49 nearest the mandrel 30 has one-half of a clutch 51 mounted thereon which is operably engageable with the half of a clutch 39 mounted on the end of the mandrel shaft 35. The shaft 49 is mounted for rotational and axial motion. The axial motion of the shaft is provided by a pair of air cylinders 52 mounted 180 degrees apart on opposite sides of the bearing to cause the clutch halves 39 and 51 to engage and disengage. The line of motion of the plungers 54 of the air cylinders 52 is parallel to the axis of the shaft 49 and the plungers 54 are connected to the shaft 49 by means of a cross-yoke 55. The shaft 49 is operably connected at the end opposite the clutch 51 to a drive motor 57 through a gear train 56. The drive motor 57 is variable speed and provides for a peripheral speed on the mandrel 30 of from about 15 feet per minute to about 260 feet per minute.

With reference to FIGS. 1 and 2, a coaxially engageable means 58 for supporting the end 60 of the shaft 35 opposite the clutch 39 is mounted on a second up-standing frame 65 which is mounted on the base 10 adjacent the end 60. The support means 58 comprises a shaft 61 in axial alignment with the mandrel shaft 35 and mounted for axial and rotary motion. The shaft 61 is provided with a conical end 62 adjacent the end 60 of the shaft 35. The conical end 62 engages a conical centering hole 63 in the end 60 of the shaft 35. The shaft 61 is supported by a bearing 64 mounted on the second up-standing frame 65. The axial movement of the shaft 61 is provided by a pair of air cylinders 66 mounted on the bearing 64 and attached to the shaft 61 in a manner similar to the air cylinders 52 attached to the drive shaft 49. The mandrel 30 in the cutting position is thus held firmly for rotation about its horizontal axis by the shaft 61 on one end and the bearing 37 on the other end.

As best seen in FIGS. 1 through 4, three cutting arbors 70, 71, 72 are disposed in a vertical plane with their rotational axes parallel. The plane of the rotational axes of the cutting arbors 70, 71, 72 is parallel to the axes of the mandrels 30, 31 and is displaced a predetermined distance from the mandrel 30 in the cutting position on the side thereof opposite the mandrel 31 in the loading position. The lowest arbor 70 or the arbor nearest the mandrel 30 in the cutting position has a plurality of rough cut circular grinders 73 mounted for rotary motion with the arbor 70. The middle arbor 71 has a plurality of smooth cut rotary grinders 74 mounted in a similar manner. The top arbor 72 has a plurality of rotary cutting blades 75 mounted in a similar manner. The grinders 73, 74 and cutting blades 75 are spaced along their respective arbors 70, 71, 72 for the entire width of the mandrel 30 in the cutting position.

As best seen in FIG. 1, each arbor 70, 71, 72 is supported be a pair of bearings 76 and 77 mounted adjacent the opposite ends of the arbors 70, 71, 72. The drive end bearings 76 are adjacent the turret end of the mandrels 30, 31 and the free end bearings 77 are adjacent the coaxially engageable means 58. The bearings 76 and 77 are mounted on a plate or carriage 78 located on the side of the arbors 70, 71, 72 opposite the mandrel 30 in the cutting position. A drive means generally illustrated at 79 is mounted on the carriage 78 and is operably connected to the end of each arbor 70, 71, 72 adjacent the drive end bearing 76. The drive means 79 provides for the same rotational speed of each arbor 70, 71, 72. The grinders 73, 74 and cutting blades 75 are all of substantially the same diameter and have a peripheral speed of approximately 7,500 feet per minute.

Figure 9:
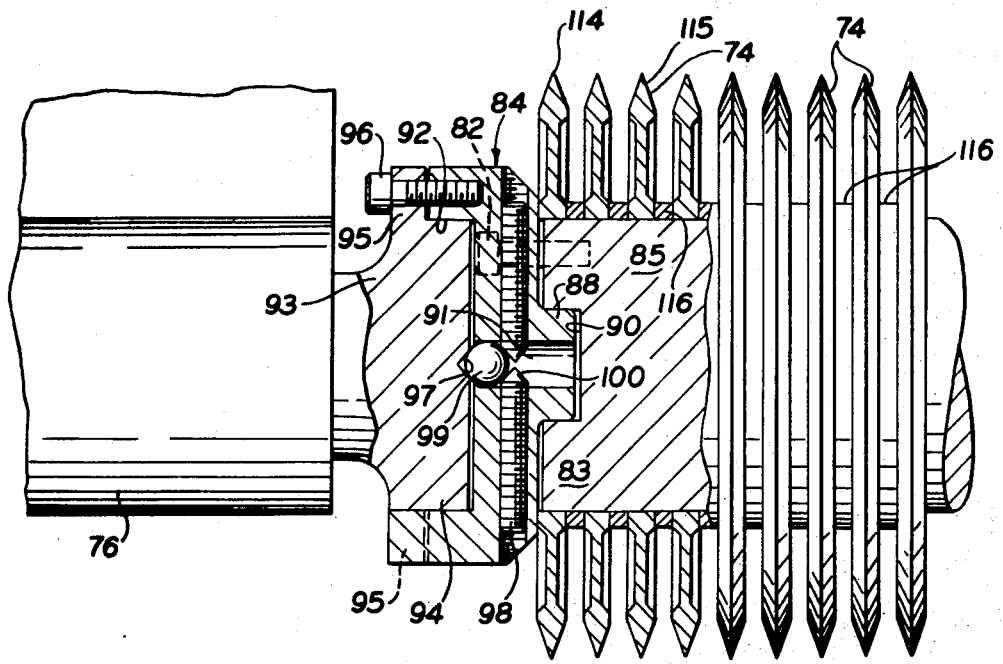
FIG. 9 is an enlarged view of a portion of a grinding arbor in the apparatus in FIG. 1 taken substantially along the line 9—9 of FIG. 1 with portions broken away.

An enlarged view of a portion of the central arbor 71 is illustrated in FIG. 9. With the exception of having different grinders or cutters, all of the arbors 70, 71, 72 are the same and a description of the central arbor 71 will cover all three arbors. The arbor 71 is provided with a straight central shaft 85 having a constant outer diameter for receiving circular grinders 74. A collet 84 is secured to the end 83 of the central shaft 85 nearest the drive end bearing 76 by bolts 82 and has a coaxial circular lug 88 received in a coaxially extending bore 90 in the end 83 of the shaft 85. The collet 84 is provided with a small coaxial throughbore 91 and a larger counterbore 92 in the end opposite the lug 88. A bearing journal 93 is rotatably supported by the drive end bearing 76 adjacent the drive means 79 and is provided with a circular boss 94 receivable in the counterbore 92 in the collet 84. The bearing journal 93 is secured in the collet 84 by means of a plurality of bolts 96 extending through an annular flange 95 on the boss 94 and threadably engaged in the collet 84.

The boss 94 is provided with a central conical depression 97 in axial alignment with the bore 91 in the collet 84. A plurality of screws 98 extend radially through the collet 84 to the bore 91. A spherical bearing 99 is disposed in the bore 91 adjacent the conical depression 97 and is secured therein by conical inner ends 100 of the radially extending screws 98. By loosening the bolts 96 and tightening the radial screws 98 the ball 99 is forced against the conical depression 97 in the boss 94 of the bearing journal 93, thus forcing the central shaft portion 85 of the arbor 71 axially away from the bearing journal 93. Conversely, by loosening the screws 98 and tightening the bolts 96 the central straight portion 85 of the arbor 71 can be drawn closer to the bearing journal 93. As noted above, all three arbors 70, 71, 72 are the same and are provided with this means for axially adjusting the central shaft 85.

With particular reference to FIG. 11, each bearing 77 on the end of each arbor 70, 71, 72 opposite the drive means 79 is slidably mounted on the carriage 78 for movement in the direction of the axis of its respective arbor 70, 71 or 72. This sliding support can be any suitable means which, in the particular embodiment illustrated, comprises a pair of guideways 105 extending parallel to the axis of the respective arbor 70, 71 or 72 and supporting base flanges 106 of the bearing 77.

As best seen in FIGS. 1 and 2, in order to secure each bearing 77 in axial position relative to its respective arbor 70, 71 or 72, an air cylinder 110 is mounted on the carriage 78 adjacent each bearing 77. The plunger 111 of each air cylinder 110 extends parallel to the axis of the respective arbor 70, 71 or 72 and is in engagement with the frame 112 of the bearing 77. When the air cylinder 110 is pressurized the plunger 111 bears axially against the bearing frame 112 and provides a predetermined axial loading on the bearing 77 against the arbor 70, 71 or 72. The bearing 77, being slidably mounted and preloaded in the axial direction by an air cylinder 110, may move axially if the arbor expands due to heat, or is moved axially by adjusting the collet arrangement 87 without changing the axial loading on the bearings 76 and 77.

As best seen in FIGS. 1 and 9, a plurality of circular grinders 74 are provided on the straight portion 85 of the middle arbor 71. The radially outer cutting surface 115 of each grinder 74 tapers to a point 114 and forms a generally V-shaped configuration when viewed in planes containing the rotational axis of the arbor 71. The V-shaped cutting surface corresponds to the taper desired on the finished V belt 15. The grinders 74 are spaced along the straight portion of the arbor shaft 85 by annular spacer rings 116. The spacer rings are such that they provide a space between each pair of grinders 74 equal to the desired width of the V belts 15. There are enough grinders 74 provided along the straight portion 85 of the arbor 71 to cut the entire sleeve 32 into V belts. The grinders 74 on the arbor 71 have a fine grain and provide the smooth finish cut on the sleeve 32. The grinders 73 on the arbor 70 are the same as the grinders 74 but are coarser to provide the first cut into the sleeve 32 to form the basic V belts.

Figure 10:
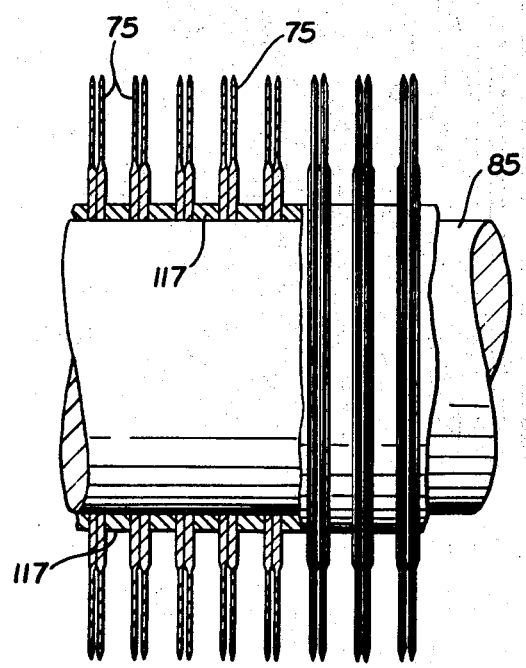
FIG. 10 is a view of a portion of the cutting arbor of the apparatus of FIG. 1 taken substantially along line 10—10 of FIG. 1 with portions broken away.

With reference to FIG. 10, the top arbor 72 is provided with a plurality of circular cutting blades 75 to sever the formed V belts in the sleeve 32 into individual V belts. The cutting blades 75 may be of any material desired but in the specific embodiment illustrated are high-speed steel heat treated to a hardness of approximately 60 Rockwell C. The cutting blades 75 are provided in pairs and the pairs spaced apart by annular rings 117 disposed about the shaft 85. The rings 117 provide the same center to center spacing between each two pairs of blades 75 as is provided between the grinders 73 or 74.

With particular reference to FIG. 1, each grinder 73 on the arbor 70 is in vertical alignment with a grinder 74 on the second arbor 71 and each grinder 73, 74 on the arbor 70, 71 is in vertical alignment with a pair of cutting blades 75 on the top arbor 72. If the vertical alignment of the grinders 73, 74 and cutting blades 75 is not precise, adjustment is necessary and can be accomplished by use of the adjusting ball bearing 99 in conjunction with the collet 84 and adjusting bolts 96 and screws 98 previously described.

As best seen in FIGS. 1 through 4, a box-like vacuum chamber 120 is mounted on the carriage 78 and encloses the cutting blades and grinders in the arbors 70, 71 and 72 with the exception of a portion of the peripheral surfaces 122 of the cutting blades and grinders nearest the mandrel 30 in the loading position which protrude through a slot 121 in the chamber 120 to engage the peripheral surface 16 of the sleeve 32. A plurality of vacuum tubes 125 extending from the side of the carriage 78 opposite the arbors, join the vacuum chamber 120 to a source of vacuum (not illustrated). This vacuum system collects the material cut and ground from the sleeve 32 during the cutting operation and helps to cool the sleeve 32, the cutting blades 75 and grinders 73, 74.

With particular reference to FIGS. 2 and 3, four slide bearings 126 are secured to the side of the carriage plate 78 opposite the arbors and are in sliding engagement over the pair of vertical rods 128. The rods 128 are rigidly supported at their lower ends on the adjusting plate 129 and at their upper ends by a frame member generally illustrated at 130.

Figure 4:
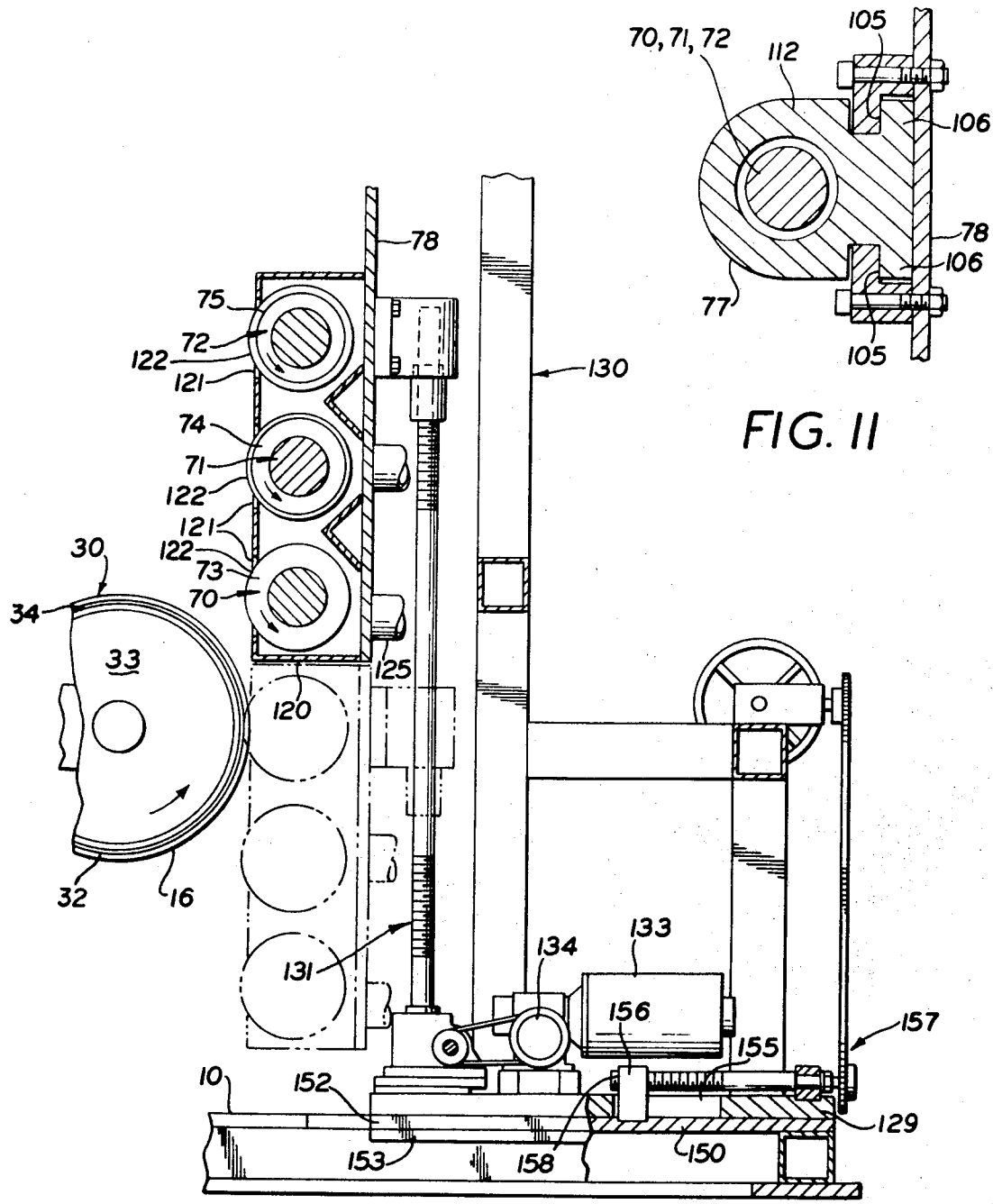
FIG. 4 is a partial side view of the apparatus of FIG. 1, taken substantially along the line 4—4 of FIG. 1.

A screw-drive arrangement, best seen in FIGS. 2 and 4 and generally illustrated at 131, is mounted on the adjusting plate or slide plate 129 between the two vertical rods 128 and operably connected to the side of the carriage plate 78 opposite the arbors 70, 71 and 72. The drive-screw arrangement 131 raises and lowers the carriage plate 78 on the rods 128. A dual drive system 132, 133 is mounted on the adjustment plate 129. The slow speed drive 133 is connected to the drive-screw 131 through a clutch 134 and a belt drive 135. The high speed drive 132 is connected to the drive screw 131 through a drive belt 136 and clutch 137. The slow speed drive 133 drives the carriage 78 in the down direction during the cutting portion of the down stroke. The high speed drive means 132 drives the carriage 78 in the up direction, which is the return stroke of the carriage 78 and in the down direction when no grinder 73, 74 or cutting blade 75 is in contact with the sleeve 32. Two drives are provided for economy of operation since the cutting portion of the stroke must be very slow and it is desirable to move the carriage 78 rapidly at other times. In the specific embodiment illustrated, the carriage 78 lowers at a speed of 1/2 to 5 inches per minute during the cutting portion of the stroke.

With reference to FIGS. 1, 2 and 4, the base 10 has a portion 150 which extends beneath the rectangular adjusting plate 129 and is generally of the same size and shape as the adjusting plate 129. The portion 150 of the base plate 10 has a pair of straight parallel edges 151 which are perpendicular to the rotational axis of the mandrels 30 and 31. Two parallel sides 149 of the adjusting plate 129 extend parallel to the edges 151 but lie laterally beyond the edges 151. A pair of elongated rectangular guide bars 152 are fixed to the bottom side of the adjusting plate 129 adjacent the sides 149 and extend parallel to and adjacent to the edges 151 of the extended portion 150 of the base plate 10 to provide a guide channel. The bars 152 terminate short of the bottom side 148 of the extended portion 150. A pair of clamping bars 153 are secured to the bottom side of the guide bars 152 by bolts 154 and extend beneath the extended portion 150. The guide bars serve to guide the adjustment plate 129 in directions perpendicular to the plane of motion of the arbors 70, 71, 72. The adjustment plate 129 can be fixed in a desired position relative to the plane of motion of the arbors 70, 71, 72 by drawing the clamping bars 153 up tight against the extended portion 150 by means of the bolts 154.

As best seen in FIG. 4, the slide plate 129 has a slot 155 therethrough which extends in the direction of the motion of the adjusting plate 129. A lug 156 is rigidly mounted on the extended portion 150 and extends upwardly through the slot 155. A screw-drive arrangement generally illustrated at 157 is rigidly mounted on the adjusting plate 129 and is threadably engaged with the end 158 of the lug 156 which protrudes through the adjusting plate 129. By operation of the jack screw arrangement 157, the adjusting plate 129 can be moved relative to the base plate 10 in directions perpendicular to the plane of motion of the arbors 70, 71 and 72. This provides a means for adjusting the relative distance between the plane of motion of the arbors and the rotational axis of the mandrel 30 in the cutting position and thus a means of adjusting the depth of cut in the sleeve 32.

With particular reference to FIGS. 1 and 2, a square tubular member 160 is supported between the first and second up-standing frames 45 and 65 and has its horizontal axis lying generally below and parallel to the mandrels 30 and 31. Vertical guide blocks 166 and 167 are mounted on the opposite ends of the tubular member 160 and are in sliding engagement with vertical slide rods 168 and 169, respectively, mounted on the up-standing frames 45 and 65. A jack screw arrangement generally illustrated at 161 is mounted on the base 10 adjacent the second up-standing frame 65 and is operably connected to the tubular member 160 to raise and lower the tubular member 160 in a vertical direction along the slide rods 168, 169. A horizontal shaft 162 is mounted for rotation about its long axis inside of the tubular member 160 and extends the entire length thereof. A pinion 163 is mounted on each end of the shaft 162 for engagement with a pair of vertically extending racks 164 mounted on the base 10. This shaft and pinion arrangement maintains the tubular member 160 in a horizontal position when the tubular member 160 is being raised and lowered by the jack screw assembly 161.

An open ended box-like slide 170 is disposed about the tubular member 160 for sliding motion therealong. A rotary grinder 171 is rigidly mounted on the box-like frame with a grinding wheel 172 mounted for rotation about an axis parallel and generally below the axis of the mandrel 30 in the cutting position. By raising the tubular member 160, the grinding wheel 172 can be brought into and out of engagement with the peripheral surface of the rubber base 34 on the mandrel 30 in the cutting position. A threaded lug 175 is fixed to the box-like sleeve 170 on the side thereof opposite the grinding wheel. A rod 174 is rotatably mounted on and parallel to the tubular member 160 and is in threaded engagement with the lug 175. A drive means 176 is supported by the tubular member 160 and is operably connected to one end of the threaded shaft 174. By rotating the shaft 174 the sleeve 170 and thus the grinder 171 is drawn along the tubular member 160 in a direction parallel to the axis of the mandrel 30. The grinder 172 therefore will traverse the peripheral surface of the mandrel 30 in a direction parallel to the rotational axis thereof. If the peripheral surface of the rubber base 34 becomes irregular, a true cylindrical shape can be restored by rotating the expanded mandrel 30 and drawing the rotating grinding wheel 172 along the peripheral surface thereof.

As best seen in FIGS. 1 through 4, the mandrel 30 in the cutting position, loaded with a cured cylindrical sleeve 32, is rotated by means of the drive 48. The arbors 70, 71 and 72 are rotated by means of the drive 79. The drive means 132, 133 draw the carriage 78 downwardly along the slide rods 128 and the cutting arbors 70, 71 and 72 sequentially traverse the peripheral surface of the mandrel 30 in the cutting position in a direction perpendicular to the axis of the mandrel 30 (as illustrated in phantom in FIGS. 3 and 4) and cut the grooves 13 in the sleeve 32 previously described and illustrated in FIGS. 5 and 6. The grinder 73 on the arbor 70 make the first rough cut in the sleeve 32, then the grinders 74 on the arbor 71 smooth off the sides 17 of the V belts and finally the cutting blade 75 on the arbor 72 make the final cut to separate the V belts 15. While the arbors are cutting the grooves in the sleeve 32 on the mandrel 30 in the cutting position, the operator removes previously formed V belts 15 from the mandrel 31 in the loading position and places a new cured cylindrical sleeve 32 thereabout. When the carriage 78 completes it cutting stroke it is raised back to its original position above the mandrel 30. The turret 42 is then rotated 180° to switch positions of the two mandrels 30, 31 and the operations described above are repeated.

This apparatus provides a means of cutting a cylindrical sleeve into a plurality of V belts in a one-stroke operation of the cutting means. The cutting and grinding means are moved into engagement with the peripheral surface of the rotating cylindrical sleeve along paths lying in a plane perpendicular to the rotational axis of the cylindrical sleeve. Thus it can be seen that there is no unbalanced axial thrust on the cylindrical sleeve to distort the sleeve and cause irregularities in the final V belt.

While in the specific embodiment illustrated there are two arbors having grinding means or grinding wheels and one arbor cutting means or circular blades, it is to be understood that any combination of grinders or grinders and cutting blades may be used. Further, while the cutting blades 75 are shown as arranged in pairs to sever the sleeve between adjacent belts, it should be understood that a single cutting blade could be used.

While certain representative embodiments and details have been shown for the purpose of illustrating the invention, it will be apparent to those skilled in this art that various changes and modifications may be made therein without departing from the spirit or scope of the invention.

What is claimed is:

1. A method of forming a plurality of endless V belts from a vulcanized cylindrical sleeve of cord reinforced elastomeric material comprising rigidly supporting said sleeve in a cylindrical configuration, rotating said sleeve about its longitudinal axis, and providing relative movement between a plurality of grinders and said rotating sleeve in a direction perpendicular to the rotational axis of said sleeve to engage said sleeve with said grinders and grind a plurality of peripheral grooves in said sleeve and form said V belts.

2. A method as claimed in claim 1, further including cutting the base of said grooves to sever said sleeve into a plurality of endless belts.

* * * * *